US009691381B2

(12) United States Patent
Cheng et al.

(10) Patent No.: US 9,691,381 B2
(45) Date of Patent: Jun. 27, 2017

(54) VOICE COMMAND RECOGNITION METHOD AND RELATED ELECTRONIC DEVICE AND COMPUTER-READABLE MEDIUM

(75) Inventors: Yiou-Wen Cheng, Hsinchu (TW); Liang-Che Sun, Taipei (TW); Chao-Ling Hsu, Hsinchu (TW); Hsi-Kang Tsao, Taipei (TW); Jyh-Horng Lin, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 602 days.

(21) Appl. No.: 13/400,585

(22) Filed: Feb. 21, 2012

(65) Prior Publication Data

US 2013/0218573 A1  Aug. 22, 2013

(51) Int. Cl.
  *G10L 21/00*  (2013.01)
  *G06F 17/21*  (2006.01)
  *G10L 15/22*  (2006.01)

(52) U.S. Cl.
  CPC ........ *G10L 15/22* (2013.01); *G10L 2015/223* (2013.01); *G10L 2015/228* (2013.01)

(58) Field of Classification Search
  CPC ....... G10L 15/22; G10L 13/043; G10L 21/06; G06F 3/167
  USPC ............................................... 704/275, 270.1
  See application file for complete search history.

(56) References Cited

U.S. PATENT DOCUMENTS

| 5,689,619 | A  | * | 11/1997 | Smyth ................ G02B 27/0093 |
| | | | | 345/156 |
| 6,101,472 | A  | * | 8/2000  | Giangarra ............... G10L 15/22 |
| | | | | 704/270 |
| 6,418,199 | B1 | * | 7/2002  | Perrone ............. G06F 17/30663 |
| | | | | 379/88.01 |
| 6,795,806 | B1 |   | 9/2004  | Lewis |
| 7,149,970 | B1 |   | 12/2006 | Pratley |
| 7,240,002 | B2 | * | 7/2007  | Minamino ............ G10L 15/083 |
| | | | | 704/236 |
| 8,150,699 | B2 | * | 4/2012  | Patch ...................... G10L 15/22 |
| | | | | 704/275 |

(Continued)

FOREIGN PATENT DOCUMENTS

CN  1335571 A  2/2002
CN  1449558 A  10/2003
(Continued)

*Primary Examiner* — David Hudspeth
*Assistant Examiner* — Timothy Nguyen
(74) *Attorney, Agent, or Firm* — Winston Hsu

(57) ABSTRACT

An electronic device for browsing a document is disclosed. The document being browsed includes a plurality of command-associated text strings. First, a text string selector of the electronic device selects a plurality of candidate text strings from the command-associated text strings. Afterward, an acoustic string provider of the electronic device prepares a candidate acoustic string for each of the candidate text strings. Thereafter, a microphone of the electronic device receives a voice command. Next, a speech recognizer of the electronic device searches the candidate acoustic strings for a target acoustic string that matches the voice command, wherein the target acoustic string corresponds to a target text string of the candidate text strings. Finally, a document browser of the electronic device executes a command associated with the target text string.

13 Claims, 7 Drawing Sheets

(56) References Cited

U.S. PATENT DOCUMENTS

| | | | |
|---|---|---|---|
| 2003/0074196 A1* | 4/2003 | Kamanaka | G10L 13/07 704/260 |
| 2005/0024239 A1* | 2/2005 | Kupka | G06F 3/0482 341/20 |
| 2005/0251393 A1* | 11/2005 | Georgescu | G06F 17/30899 704/270.1 |
| 2005/0283367 A1* | 12/2005 | Ativanichayaphong | G10L 15/22 704/270 |
| 2006/0136221 A1* | 6/2006 | James | G06F 9/4443 704/275 |
| 2006/0293893 A1 | 12/2006 | Horvitz | |
| 2007/0078659 A1* | 4/2007 | Visitkitjakarn | G06F 17/30899 704/275 |
| 2007/0088557 A1* | 4/2007 | Andrew | G06F 3/167 704/270.1 |
| 2009/0289895 A1* | 11/2009 | Nakada | G06F 3/015 345/157 |
| 2010/0105364 A1* | 4/2010 | Yang | G06F 17/30663 455/414.1 |
| 2010/0169098 A1* | 7/2010 | Patch | G10L 15/22 704/275 |
| 2011/0161076 A1 | 6/2011 | Davis | |
| 2011/0301943 A1* | 12/2011 | Patch | G10L 15/26 704/9 |
| 2012/0052909 A1* | 3/2012 | Joh | G08C 17/02 455/557 |

FOREIGN PATENT DOCUMENTS

| | | |
|---|---|---|
| CN | 101002455 A | 7/2007 |
| CN | 101681201 A | 3/2010 |

\* cited by examiner

VOICE COMMAND RECOGNITION METHOD AND RELATED ELECTRONIC DEVICE AND COMPUTER-READABLE MEDIUM

BACKGROUND

1. Technical Field

The invention relates generally to command recognition, and more particularly, to voice command recognition.

2. Related Art

Using electronic devices to browse information contained in documents is what many people do every day. Herein the used electronic devices can be personal computers (PCs), notebook computers (NBs), tablet computers, smart phones, internet protocol televisions (IPTVs), set-top boxes (STBs), and video game consoles, etc. The documents being browsed can be webpages and other documents that contain information.

A document, especially a webpage, can include a plurality of command-associated text strings. A command-associated text string contains one or more than one successive letters/words, whether in the text format or appears in an image. Each of the command-associated text string is associated with at least one command. Such a command can be a hyperlink-related command that, for example, can cause the electronic device to open another document or to jump to a bookmark within the currently-browsed or another document. As another example, a command of another type can cause the electronic device to show a menu/image, to start an application program, or to send a message to a device hosting the document being browsed.

Frequently, the user browsing the document can see a command-associated text string if the text string is within a displayed region of the document. In contrast, the user browsing the document normally does not see the detail of the command associated with the text string because the associated command frequently appears only in the source code of the document and is not displayed.

FIG. 1 shows a part of the USPTO's webpage for patent captured by the applicants on Jan. 10, 2012, with some italicized illustrations added by the applicants additionally. The address of this webpage is http://www.uspto.gov/patents/index.jsp. This webpage has a banner area that contains command-associated text strings of "PATENTS," "TRADE-MARKS," "IP LAW & POLICY," . . . , "FAQs," and "ABOUT." For example, the command-associated text string of "IP LAW & POLICY" is associated with a hyperlink-related command that can cause the electronic device to open the webpage on http://www.uspto.gov/ip/index.jsp. In addition, the webpage shown in FIG. 1 has a sidebar area that contains command-associated text strings of "Patent Process," "Patent Classification," "Patent Forms," . . . , "Employee Locator," and "Contact Patents." For example, the command-associated text string of "Patent Forms" is associated with a hyperlink-related command that can cause the electronic device to open the webpage on http://www.uspto.gov/forms/index.jsp. Furthermore, the webpage shown in FIG. 1 has a body area that contains images of "Search Patents," "PAIR," "EFS-Web," . . . , "ACCELERATED EXAMINATION," and "Contact Us." Each of these text strings contained in the images is a command-associated text string. For example, the command-associated text string of "PAIR" is associated with a hyperlink-related command that can cause the electronic device to open the webpage on http://www.uspto.gov/patents/process/status/index.jsp.

The electronic device used to browse the document will execute a command when the user browsing the document does something to the text string associated with that command. Conventionally, the user can have the electronic device execute the command by moving a cursor onto the command-associated text string, or by clicking/touching the command-associated text string.

The conventional methods mentioned in the previous paragraph may satisfy some people, but other people may still be interested in some other unconventional methods. These conventional methods may be convenient for users of PCs, NBs, tablet computers, and smart phones. However, users of devices such as IPTVs, STBs, and video game consoles may find the conventional methods difficult to use because these devices may not have convenient user input interfaces.

SUMMARY

An embodiment of the invention provides a voice command recognition method. The method includes: selecting a plurality of candidate text strings from a plurality of command-associated text strings of a document being browsed; preparing a candidate acoustic string for each of the candidate text strings; receiving a voice command; searching the candidate acoustic strings for a target acoustic string that matches the voice command, wherein the target acoustic string corresponds to a target text string of the candidate text strings; and executing a command associated with the target text string.

Another embodiment of the invention provides an electronic device. The electronic device includes: a text string selector, configured to select a plurality of candidate text strings from a plurality of command-associated text strings of a document being browsed; an acoustic string provider, configured to prepare a candidate acoustic string for each of the candidate text strings; a microphone, configured to receive a voice command; and a speech recognizer, configured to search the candidate acoustic strings for a target acoustic string that matches the voice command, wherein the target acoustic string corresponds to a target text string of the candidate text strings. The electronic device is configured to execute a command associated with the target text string.

Still another embodiment of the invention provides a computer-readable medium storing at least one computer program which, when executed by an electronic device, causes the electronic device to perform operations including: selecting a plurality of candidate text strings from a plurality of command-associated text strings of a document being browsed; preparing a candidate acoustic string for each of the candidate text strings; receiving a voice command; searching the candidate acoustic strings for a target acoustic string that matches the voice command, wherein the target acoustic string corresponds to a target text string of the candidate text strings; and executing a command associated with the target text string.

Other features of the present invention will be apparent from the accompanying drawings and from the detailed description which follows.

BRIEF DESCRIPTION OF THE DRAWINGS

The invention is fully illustrated by the subsequent detailed description and the accompanying drawings, in which like references indicate similar elements.

FIGS. 6 and 7 show the part of the USPTO's webpage for patent with some additionally displayed indexes/symbols.

DETAILED DESCRIPTION

Figure 2:
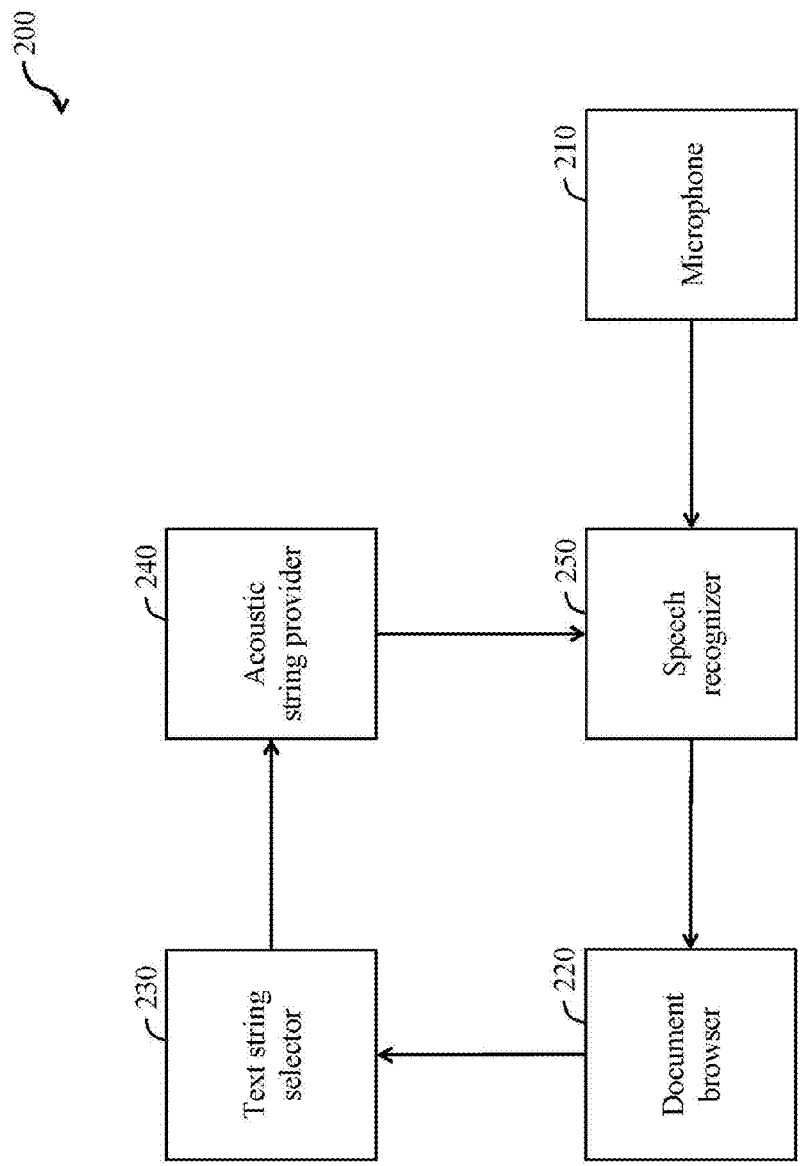
FIGS. 2, 4, and 5 show block diagrams of electronic devices according to three embodiments of the invention.

FIG. 2 shows a block diagram of an electronic device according to an embodiment of the invention. Among other functions, this electronic device 200 allows its user to browse a document.

The document being browsed can be a webpage or another kind of document that contains information. Specifically, the document includes a plurality of command-associated text strings. A command-associated text string includes one or more than one letters/words, whether in the text format or appears in an image. A command-associated text string is visible to the user of the electronic device 200 when the text string is displayed by a display device of (or connected to) the electronic device 200. For example, the display device can be a screen or a projector that projects images onto a projection screen. Each of the command-associated text strings is associated with at least one command, the detail of which is frequently not shown to the user.

One of the characteristics of the electronic device 200 is that its user can have it execute an associated command by uttering a voice command. To realize this function, the electronic device 200 of this embodiment includes a microphone 210, a document browser 220, a text string selector 230, an acoustic string provider 240, and a speech recognizer 250. Other components of the electronic device 200 are omitted from FIG. 2 to avoid digression. Except for the microphone 210, any of the components shown in FIG. 2 can be realized by dedicated hardware or a general purpose processor. Although the components are depicted as internal components of the electronic device 200, any of the components can be external to the electronic device 200 and work for the electronic device 200 through a wired or wireless connection. For example, the microphone 210 may be set on a remote device (such as a cellphone or a remote control) that can communicate with the electronic device 200 wirelessly. Furthermore, any of the other four components can lie in the so called "cloud" to facilitate cloud computation.

Figure 3:
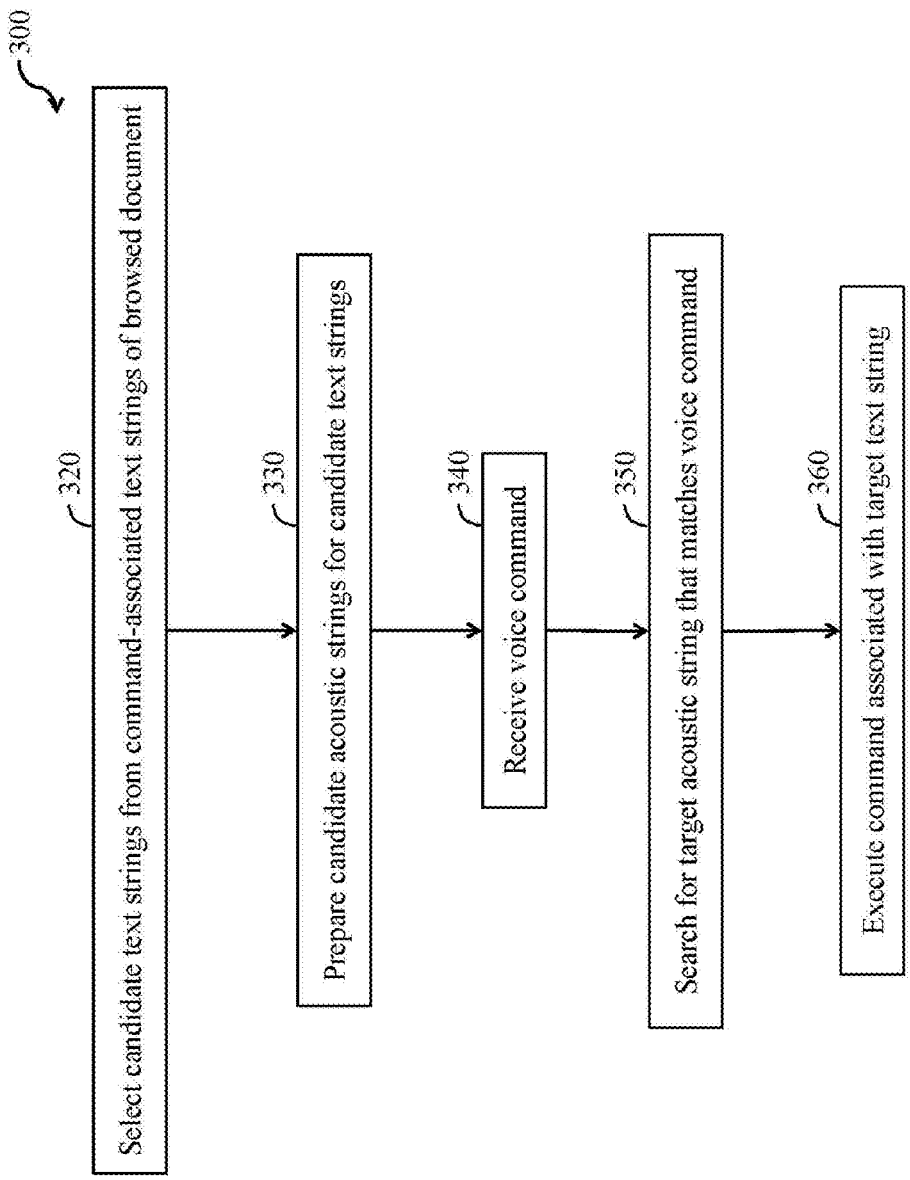
FIG. 3 shows a flowchart of a process according to an embodiment of the invention.

FIG. 3 shows a flowchart of a process according to an embodiment of the invention. Process 300 shown in FIG. 3 can be performed by the electronic device 200 shown in FIG. 2. For the sake of simplicity, the following paragraphs will use the components of the electronic device 200 to help illustrate steps of process 300, and use steps of process 300 to help illustrate the components of the electronic device 200. But please be noted that process 300 can also be performed by an electronic device other than the one shown in FIG. 2, and the electronic device 200 can also perform a process other than the one shown in FIG. 3. In other words, the electronic device 200 and process 300 do not limit each other.

Before the flowchart shown in FIG. 3 is performed, the document browser 220 can first presents the aforementioned document so that a user of the electronic device 200 can see and browse at least a part of the document. For example, if the document is a webpage hosted by another device, the document browser 220 first downloads the document from the hosting device through a network interface of the electronic device 200. Then, the document browser 220 renders the webpage and allows at least a part of the rendered document to be displayed by the display device. As a result, the user can see some visible information of the document, including some command-associated text strings. In such an example, the document browser 220 can also be referred to as a web browser. Hereinafter, to avoid digression, both the terms "document" and "document being browsed" are used to refer to either the source code of the document being browsed or the rendered version of the document being browsed (especially when the document being browsed is a webpage).

At step 320, the text string selector 230 selects a plurality of candidate text strings from the command-associated text strings of the document being browsed. As will be explained later, a set of acceptable voice commands will be prepared for the candidate text strings to facilitate speech recognition.

One of the objectives of step 320 is to limit the number of acceptable voice commands. This is because the document being browsed may have too many command-associated text strings, and it may be unnecessary, undesirable, or impractical to prepare acceptable voice commands for all the command-associated text strings. By limiting the number of acceptable voice commands, this step may also lower down the speech recognizer 250's work load and error rate, and enhance the speech recognizer 250's response speed.

There are several alternatives for implementing step 320. In a first alternative, the text string selector 230 selects candidate text strings only from some sub-regions of the document being browsed. One of the rationales behind this alternative is that the user may be interested in only some of the sub-regions of the document being browsed, and may not pay attention to the rest parts. As a result, the user likely will utter a voice command that corresponds to a command-associated text string appears in the interested region(s).

Figure 1:
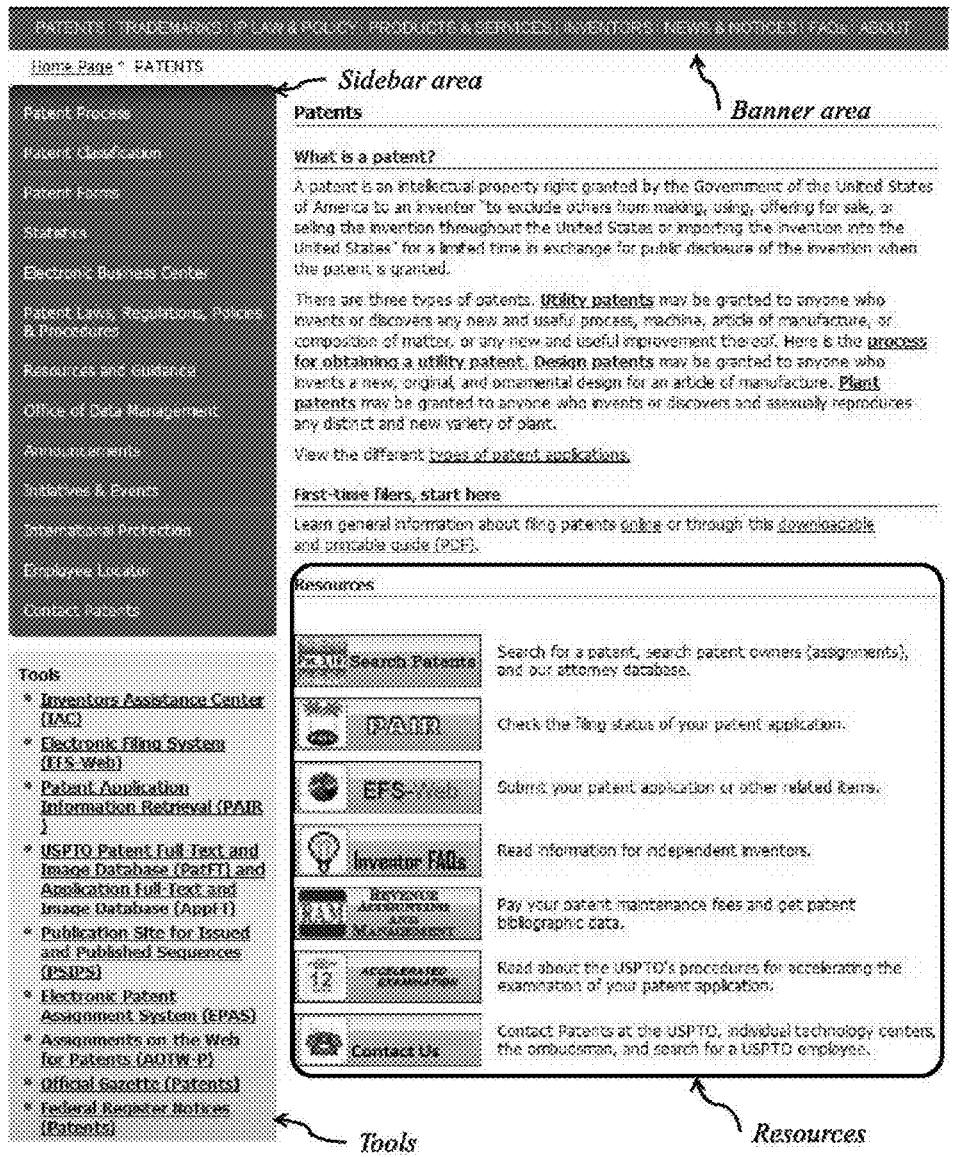
FIG. 1 shows a part of the USPTO's webpage for patent.

In a first example of the first alternative, the region from which the candidate text strings are selected is a displayed region of the document, i.e. the region of the document that appears on the screen. One of the rationales behind this example is that the screen may not be big enough to show all the visible information of the document. It's unlikely that the user will issue a voice command related to what does not appear on the screen. For example, the USPTO's webpage for patent contains more than what is shown in FIG. 1, but the screen may be big enough to display only the content shown in FIG. 1. The region shown in FIG. 1 can serve as the region from which the candidate text strings are selected.

In a second example of the first alternative, the region from which the candidate text strings are selected is a gazed region of the document, i.e. the region that is gazed by the user. The gazed region can be a sub-region of the displayed region mentioned above. One of the rationales behind this example is that the user likely will issue a voice command related to a command-associated text string the user is paying attention to. Using FIG. 1 as an example, if the user is gazing at the resources region that contains the images of "Search Patents," "PAIR," "EFS-Web," . . . , and "Contact Us," this gazed region can serve as the region from which the candidate text strings are selected. Of course, the electronic device 200 must first transform the images into text strings. As a result, 7 candidate text strings, including "Search Patents," "PAIR," "EFS-Web," . . . , and "Contact Us," will be selected. To facilitate this alternative, the electronic device 200 has to further include, or be connected to, an eye tracker that assists in defining the gazed region by tracking the user's eyes. The eye tracker can be a camera.

Figure 4:
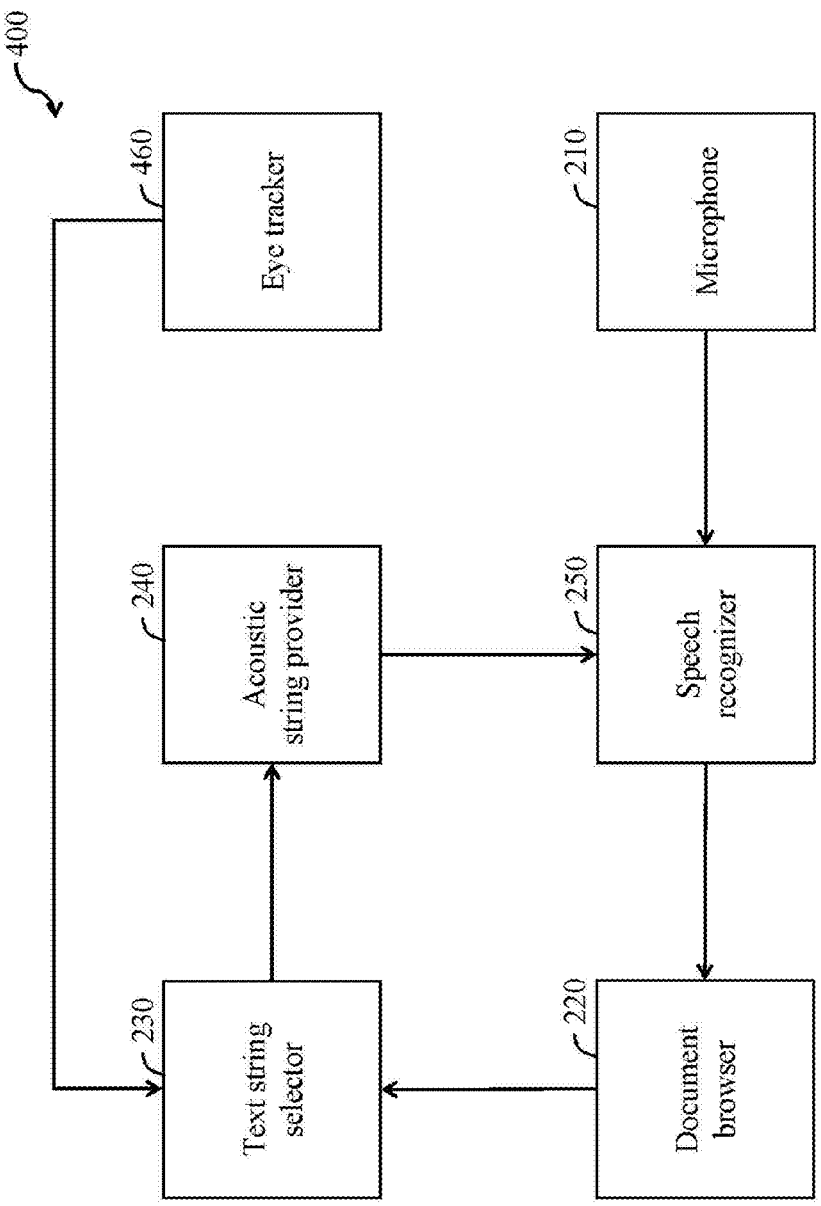

The inclusion of such an eye tracker 460 changes the electronic device 200 into an electronic device 400 shown in FIG. 4.

Figure 5:
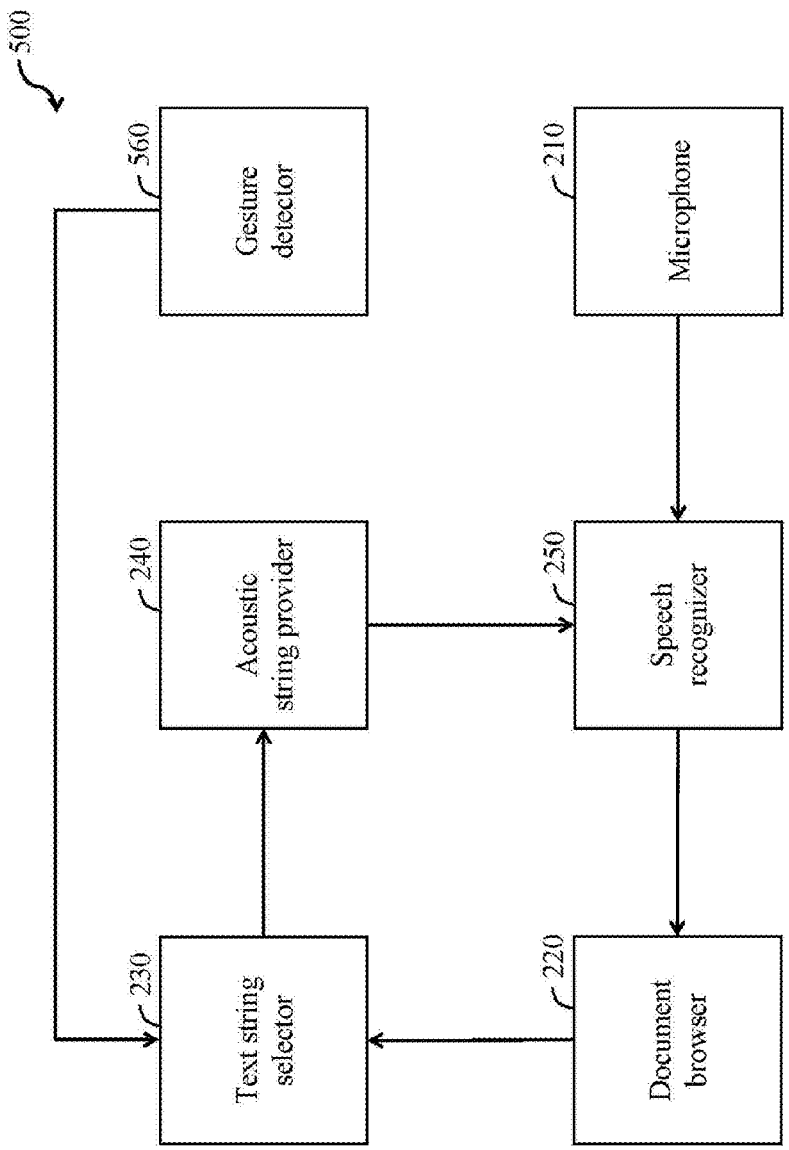

In a third example of the first alternative, the region from which the candidate text strings are selected is a gesture-specified region, i.e. a region specified by the user's gesture. The gesture-specified region can be a sub-region of the displayed region mentioned above. For example, if display device is a touch panel, the user can touch the touch panel with some gesture in order to define the gesture-specified region. The electronic device 200 can also use a camera to detect the user's gesture in order to define the gesture-specified region. One of the objectives of this example is to allow the user to involve more actively in the selection process of step 320. Using FIG. 1 as an example, the user can use gesture to specify the sidebar region, the region under "Tools," or the region under "Resources," and the specified region will then serve as the region from which candidate text strings are selected. To facilitate this alternative, the electronic device 200 has to further include, or be connected to, a gesture detector that assists in defining the gesture-specified region by detecting the user's gestures. As mentioned above, the gesture detector can be either touch sensors of a touch panel or a camera. The inclusion of such a gesture detector 560 changes the electronic device 200 into an electronic device 500 shown in FIG. 5.

In a fourth example of the first alternative, the region from which the candidate text strings are selected is one of the pre-defined regions of the document being browsed. For example, the document being browsed may have pre-defined regions such as a banner region, a sidebar region, and a footer region. Each of these regions can include a group of command-associated text strings. If the user informs the electronic device 200 that one pre-defined region of the document is of interest to the user, the text string selector 230 can select candidate text strings only from that pre-defined region. There are several ways that the user can inform the electronic device 200 what pre-defined region the user is interested in. Some exemplary ways include making a gesture, gazing at the interested region, moving a cursor onto the interested region, uttering the name of the region (e.g. uttering the word "sidebar") to the microphone 210, and pressing some buttons on the remote device. Using FIG. 1 as an example, if the user informs the electronic device 200 that the sidebar region is of interest to the user, 13 candidate text strings, including "Patent Process," "Patent Classification," . . . , and "Contact Patents," will be selected.

In a second alternative of step 320, the text string selector 230 selects only the command-associated text strings from a subordinate level of a parent object informed by the user. One of the rationales behind this alternative is that the document being browsed may have some hierarchical structures, and the user may be interested in only some parts of the structures. For example, the webpage shown in FIG. 1 has parent objects of "Tools" and "Resources." These two parent objects are not (although they can be) command-associated text strings by themselves; each of them has a subordinate level underneath it. For example, the subordinate level of the parent object "Tools" includes 9 command-associated text strings of "Inventors Assistance Center (IAC)," "Electronic Filing System (EFS-Web)," . . . , and "Federal Register Notices (Patents)." If the user informs the electronic device 200 that the user is interested in the parent object "Tools," then the text string selector 230 can select these 9 command-associated text strings as candidate command-associated text strings. There are several ways that the user can inform the electronic device 200 what parent object is of interest to the user. Some exemplary ways include making a gesture, gazing at the interested object, moving a cursor onto the object, uttering the name of the object to the microphone 210, and pressing some buttons on the remote device.

In a third alternative of step 320, the candidate text strings are selected so that each of them has a portion that is similar to, or even completely matches, a partial voice command uttered by the user to the microphone 210. Using FIG. 1 as an example, if the user utters the word "electronic" as the partial voice command, the command-associated text strings that start with or include the word "electronic" will be selected as the candidate text strings. These candidate text strings includes "Electronic Business Center" in the sidebar region, and "Electronic Filing System (EFS-Web)" and "Electronic Patent Assignment System (EPAS)" in the region underneath "Tools." This alternative allows the user to gradually narrow down the focus and to eventually reach the command-associated text string the user is interested in. This alternative is like a coarse search and is somehow similar to the "AutoComplete" function of some web browsers, under which a list of potentially complete search queries will be displayed when only a partial search query is typed. The list of the potentially complete search queries will be renewed every time a new letter/word is typed. As to this alternative of step 320, every time an additional letter/word is uttered, the text string selector 230 can renew the list of the candidate text strings and display the renewed list on the screen. The microphone 210, the acoustic string provider 240, and the speech recognizer 250 can assist in carrying out this alternative of step 320.

At step 330, the acoustic string provider 240 prepares a candidate acoustic string for each of the selected candidate text strings to facilitate subsequent speech recognition. Herein a candidate acoustic string includes one or more than one successive acoustic units. Each of the acoustic units may represent a speech sound; e.g. each of the acoustic units can be a syllable or a phoneme. Each of the candidate acoustic strings may represent an acceptable voice command that the user may speak for the corresponding candidate text string.

In a first example of step 330, each of the candidate acoustic strings directly represents the pronunciation of the corresponding candidate text string. In other words, the acoustic string provider 240 directly transforms each of the candidate text strings into a candidate acoustic string. If a candidate text string appears in an image, the electronic device 200 can first transform the content of the image into text format, and then transform the text string in text format into a candidate acoustic string. Afterward, the user can have the electronic device 200 execute a command by uttering a candidate text string corresponding to the command.

In a second example of step 330, each of the candidate acoustic strings represents the pronunciation of the sequence (i.e. order) of the corresponding candidate text string among the candidate text strings. This second example is useful especially when the candidate text strings constitute a list on the screen and the user can refer to each candidate text string by its sequence within the list. Using FIG. 1 as an example, if the banner region is selected at step 320, the candidate acoustic string that is prepared for the candidate text string of "IP LAW & POLICY," which is the third one of the list, can represent the pronunciation of a phrase such as "number three," "item three," "third item," "the third one," "third," "three," etc. Then, with steps 340, 350, and 360, the user can have the electronic device 200 execute a command associated with "IP LAW & POLICY" by uttering any of these phrases to the microphone 210. As an alternative, the user may bypass steps 340, 350, and 360, and instead have the electronic device 200 execute the command associated with "IP LAW & POLICY" by pressing a button labeled with "3" on the remote device. Similarly, the user can have the electronic device 200 execute a command associated with "TRADEMARKS" by uttering "number two," "item two," "second item," "second," or "two" to the microphone 210, or by pressing a button labeled with "2" on the remote device.

Figure 6:
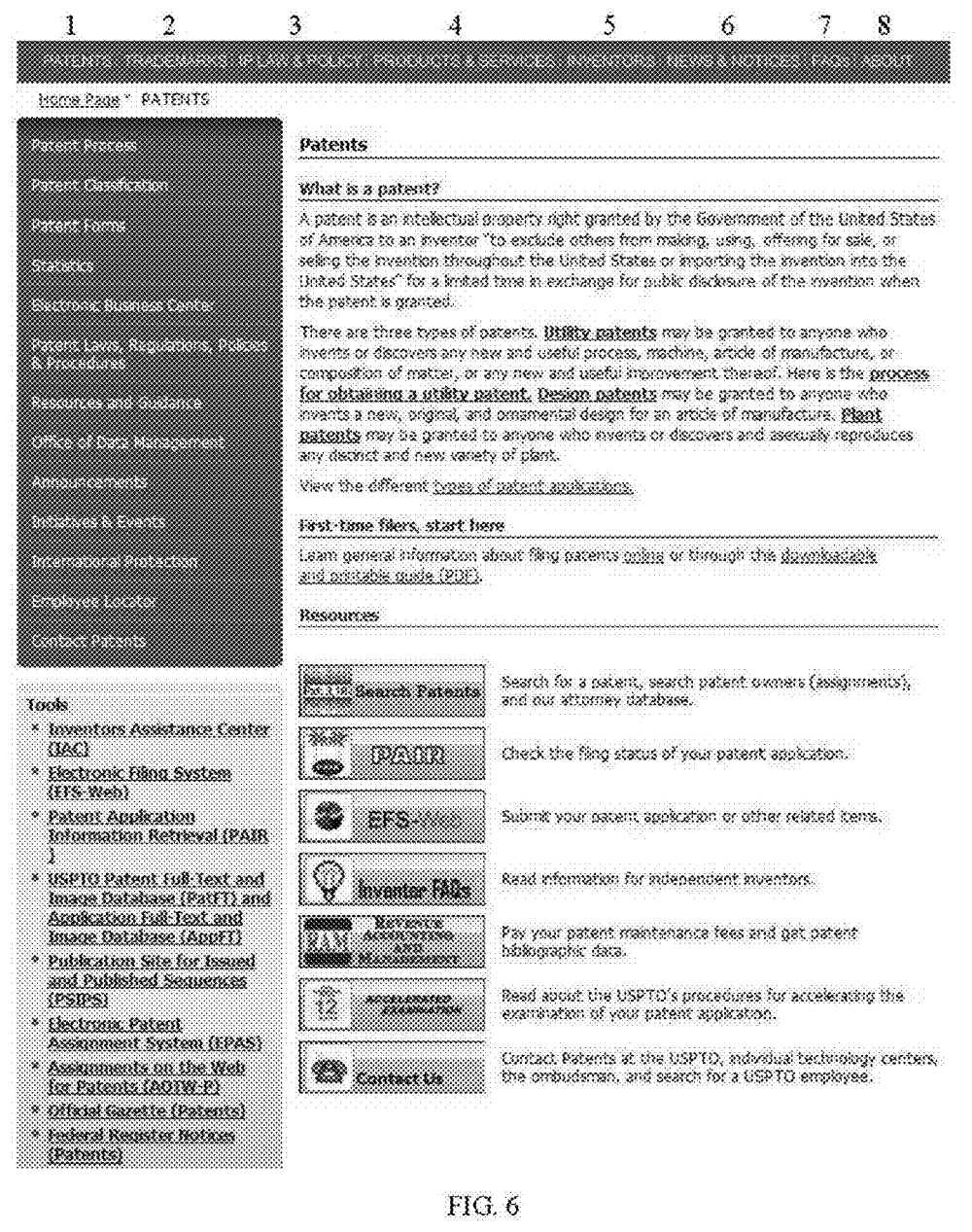

To make the sequences of the candidate text strings more apparent to the user, the electronic device 200 can additionally display numerical indexes nearby the candidate text strings. FIG. 6 shows what is seen by the user after the additional numerical indexes are displayed. To make the list more apparent to the user, the electronic device 200 can even display this numbered list in another area additionally, such as an overlaying window or a sidebar area on the screen of the electronic device 200, or on a screen of the remote device.

Figure 7:
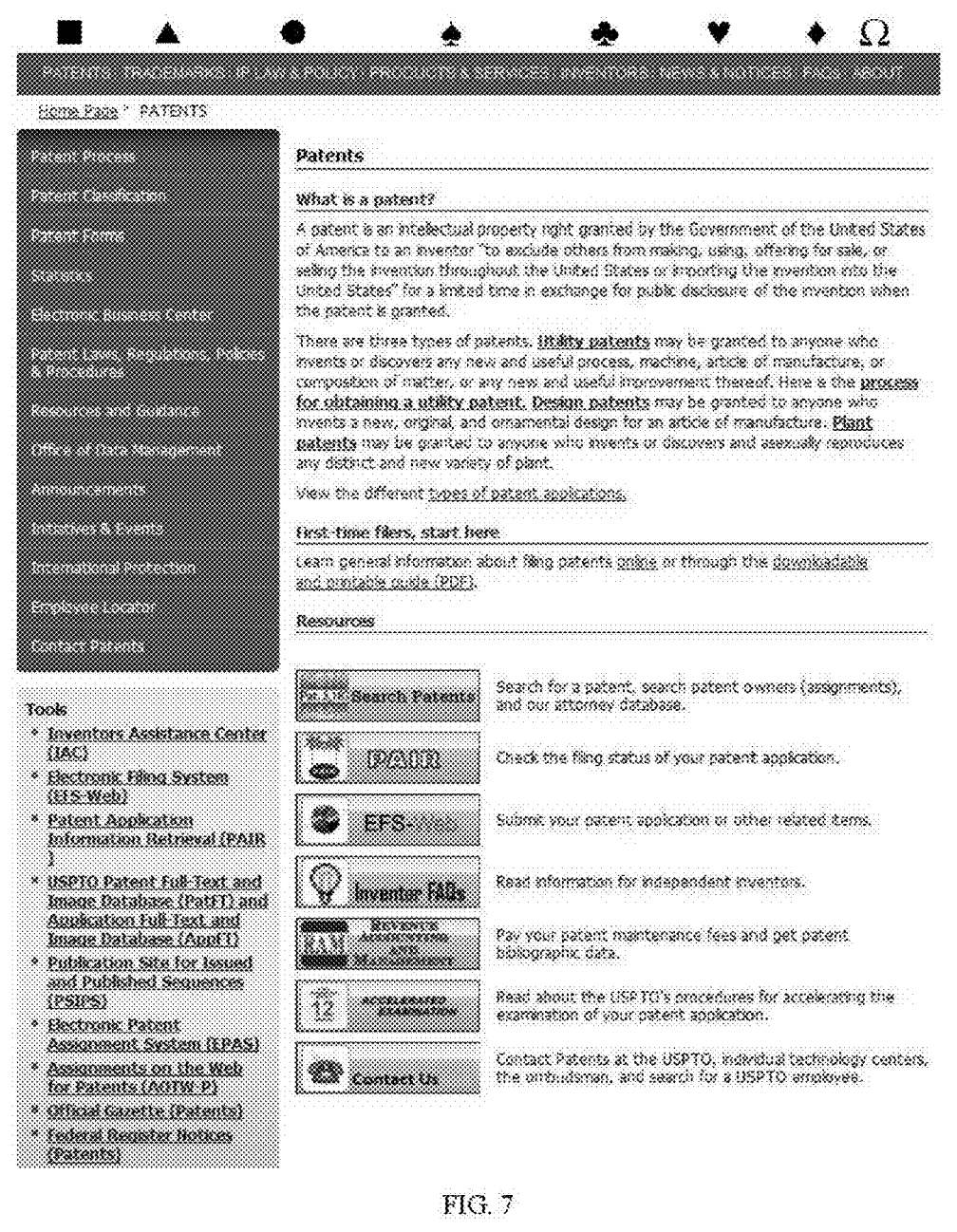

In a third example of step 330, each of the candidate acoustic strings represents the pronunciation of a symbol additionally displayed by the electronic device 200 nearby a corresponding candidate text string. Using FIG. 1 as an example, if the banner region is selected at step 320, the electronic device 200 can additionally display 8 symbols nearby the eight candidate text strings, and FIG. 7 shows what is seen by the user after some exemplary symbols are displayed. Viewing the page shown in FIG. 7, the user can have the electronic device 200 execute the commend associated with "PATENTS," "TRADEMARKS," "IP LAW & POLICY," . . . , "FAQs," or "ABOUT" by uttering "square," "triangle," "circle," . . . , "diamond," or "omega" to the microphone 210. To make the relationship between the command-associated text strings and the symbols more apparent to the user, the electronic device 200 can even display them in another area additionally, such as an overlaying window or a sidebar area on the screen of the electronic device 200, or on a screen of the remote device. The aforementioned symbols can have different colors, and the user can utter the color (and/or the shape) of a symbol to have the electronic device 200 execute the command associated with the candidate text string nearby the additionally displayed symbol that is uttered by the user. As an alternative, if the remote device has a button of that symbol, the user can press the button to have the electronic device 200 execute the command.

At step 340, the microphone 210 receives a voice command from the user. For example, the content of the voice command is a candidate text string the user sees on the screen, or the sequence of the candidate text string in the list of candidate text strings, or an index/symbol additionally displayed nearby a candidate text string.

Then, at step 350, the speech recognizer 250 searches the candidate acoustic strings for a target acoustic string that matches the voice command. The target acoustic string is associated with, i.e. is prepared for, a target candidate text string of the candidate text strings. In this example, a match can mean that the voice command sounds like the target acoustic string. As mentioned above, step 320 has limited the number of the candidate acoustic strings for the speech recognizer 250 to search. Hence, step 350 does not give the speech recognizer 250 too much work load. As a result, the speech recognizer 250 can have a low error rate and a high response speed in performing step 350.

Finally, at step 360, the document browser 220 executes the command associated with the target candidate text string. For example, if the associated command is related to a hyperlink to another webpage, the document browser 220 can simply open that linked webpage at step 360. If the associated command is about sending a message to a device hosting the document being browsed, the document browser 220 can proceed to send out the message.

The aforementioned embodiments are valuable especially when the electronic device 200 does not have a convenient input interface (such as a mouse, a track point, a track pad, or a touch screen) for the user to select a commend-associated text string from the document being browsed in order to have the electronic device 200 execute an associated command. Rather than using an inconvenient input interface to select the commend-associated text string, the embodiments allow the user to simply utter the content or sequence of or index/symbol nearby that text string, and then the electronic device 200 will execute the associated command automatically. As a result, the embodiments make the browsing of the document more convenient and more intuitive.

A programmer can write at least one computer program for process 300 or a part of it. The at least one computer program can be stored in a computer-readable medium. When executed by an electronic device, such as the one shown in FIG. 2, 4, or 5, the at least one computer program can cause the electronic device to perform process 300 or a part of it.

In the foregoing detailed description, the invention has been described with reference to specific exemplary embodiments thereof. It will be evident that various modifications may be made thereto without departing from the spirit and scope of the invention as set forth in the following claims. The detailed description and drawings are, accordingly, to be regarded in an illustrative sense rather than a restrictive sense.

What is claimed is:

1. A voice command recognition method for an electronic device, comprising:
    utilizing a text string selector to dynamically select a plurality of command-associated text strings of a document being browsed as candidate text strings, wherein the candidate text strings are displayed to a user;
    utilizing an acoustic string provider to prepare a candidate acoustic string for each of the candidate text strings, respectively;
    utilizing a microphone to receive a voice command;
    utilizing a speech recognizer to search the candidate acoustic strings for a target acoustic string that matches the voice command, the target acoustic string corresponding to a target text string of the candidate text strings; and
    utilizing the electronic device to execute a command associated with the target text string;
    wherein each of the candidate acoustic strings represents the pronunciation of a symbol additionally displayed next to a corresponding candidate text string to represent that corresponding text string.

2. The method of claim 1, wherein the additionally displayed symbols are a sequence of numbers and each of the candidate acoustic strings represents the pronunciation of a number of a corresponding candidate text string among the plurality of candidate text strings.

3. The method of claim 1, wherein the step of selection comprises:
    selecting the command-associated text strings in a displayed region of the document to be the candidate text strings.

4. The method of claim 1, wherein the step of selection comprises:

selecting the command-associated text strings in a region specified by a user browsing the document to be the candidate text strings.

5. The method of claim 1, wherein the step of selection comprises:
selecting the command-associated text strings in a gazed region of the document to be the candidate text strings.

6. The method of claim 1, wherein the step of selection comprises:
selecting the command-associated text strings in a gesture-specified region of the document to be the candidate text strings.

7. The method of claim 1, wherein the step of selection comprises:
selecting the command-associated text strings in a subordinate level of a parent object specified by a user browsing the document to be the candidate text strings.

8. An electronic device, comprising:
a text string selector, configured to dynamically select a plurality of command-associated text strings of a document being browsed as candidate text strings, wherein the candidate text strings are displayed to a user;
an acoustic string provider, configured to prepare a candidate acoustic string for each of the candidate text strings, respectively;
a microphone, configured to receive a voice command; and
a speech recognizer, configured to search the candidate acoustic strings for a target acoustic string that matches the voice command, the target acoustic string corresponding to a target text string of the candidate text strings;
wherein each of the candidate acoustic strings represents the pronunciation of a symbol additionally displayed next to a corresponding candidate text string to represent that corresponding text string, and the electronic device is configured to execute a command associated with the target text string.

9. The electronic device of claim 8, wherein the additionally displayed symbols are a sequence of numbers and each of the candidate acoustic strings represents the pronunciation of a number of a corresponding candidate text string among the plurality of candidate text strings.

10. The electronic device of claim 8, wherein the text string selector is configured to select the command-associated text strings in a displayed region of the document to be the candidate text strings.

11. The electronic device of claim 8, wherein the text string selector is configured to select the command-associated text strings in a gazed region of the document to be the candidate text strings, and the electronic device further comprises an eye tracker configured to assist in defining the gazed region by tracking a user's eyes.

12. The electronic device of claim 8, wherein the text string selector is configured to select the command-associated text strings in a gesture-specified region of the document to be the candidate text strings, and the electronic device further comprises a gesture detector configured to assist in defining the gesture-specified region by detecting a user's gestures.

13. A non-transitory computer-readable medium comprising a microphone and storing at least one computer program which, when executed by an electronic device, causes the electronic device to perform operations comprising:
dynamically selecting a plurality of command-associated text strings of a document being browsed as candidate text strings, wherein the candidate text strings are displayed to a user;
preparing a candidate acoustic string for each of the candidate text strings, respectively;
receiving a voice command;
searching the candidate acoustic strings for a target acoustic string that matches the voice command, the target acoustic string corresponding to a target text string of the candidate text strings; and
executing a command associated with the target text string;
wherein each of the candidate acoustic strings represents the pronunciation of a symbol additionally displayed next to a corresponding candidate text string to represent that corresponding text string.

* * * * *